Nov. 14, 1961 G. H. EASH 3,009,024

MAGNETIC RECORDER

Filed July 19, 1954 3 Sheets-Sheet 1

INVENTOR.
George H. Eash

BY Malcolm W. Fraser

ATTORNEY

Nov. 14, 1961 G. H. EASH 3,009,024

MAGNETIC RECORDER

Filed July 19, 1954 3 Sheets-Sheet 2

INVENTOR.
George H. Eash
BY Malcolm W. Fraser
ATTORNEY

Nov. 14, 1961 G. H. EASH 3,009,024

MAGNETIC RECORDER

Filed July 19, 1954 3 Sheets-Sheet 3

INVENTOR.
George H. Eash
BY
[signature]
ATTORNEY

United States Patent Office 3,009,024
Patented Nov. 14, 1961

3,009,024
MAGNETIC RECORDER

George H. Eash, Toledo, Ohio, assignor, by mesne assignments, to The Toledo Trust Company, trustee, Toledo, Ohio, a corporation of Ohio Filed July 19, 1954, Ser. No. 443,995
8 Claims. (Cl. 179—100.2)

This invention relates to tape recording-reproducing systems but more particularly to instruments of this character employing a magazine or cartridge containing a length of magnetic tape in a coil with a length exposed for engagement with the transducer head and the like.

An object is to produce a simple and efficient retractor for the magnetic tape cartridge which automatically moves the cartridge away from operative position with respect to the drive and transducer head after a predetermined length of the tape has traveled past same.

Another object is to retract the magnetic tape cartridge by electromechanical means in response to a conducting spot on the tape without disturbing the operation of the tape driving capstan so that the driving motor continues running at the desired speed preparatory to resuming the reproducing of the message on the tape or recording on same.

A further object is to provide a tape recording-reproducing instrument with electromechanical retracting means for the endless tape cartridge which is manually controllable and operates in response to a conducting spot on the tape, the arrangement being such that the cartridge is moved bodily away from the drive and transducer and is yieldingly held in retracted position.

A still further object is to produce a retractor for the tape cartridge having spring means for holding the cartridge in playing position until means operates automatically to retract the cartridge away from operative position without in any way interfering with the tape drive which is then ready instantaneously to impart the traveling movement to the tape upon application of a cartridge in playing position.

A still further object is to produce a new and improved high speed drive for the endless cartridge containing tape, thereby enabling a faster movement of the tape to be obtained for selecting and playing the desired recorded material without disturbing the operation of the driving source which continues to operate at a uniform speed, the high tape speed being conveniently achieved by manipulation of a manual control which upon being released automatically reestablishes the normal slower tape drive.

Other objects and advantages will hereinafter appear, and for purposes of illustration but not of limitation, an embodiment of the invention is shown in the accompanying drawings, in which.

Figure 1:
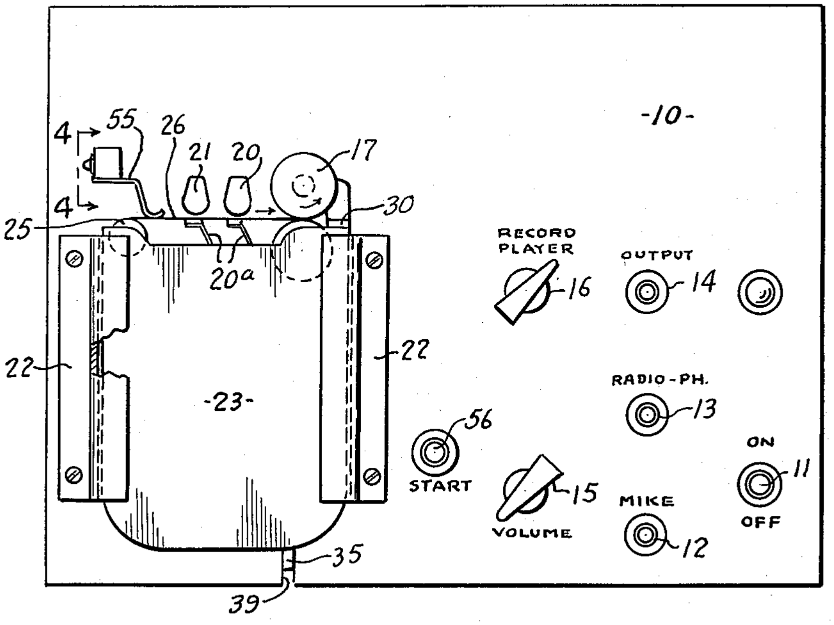
FIGURE 1 is a top plan view of a reproducing-recording instrument employing magnetic tape, showing an endless tape cartridge mounted in operative position.

The illustrated embodiment of the invention comprises a reproducing-recording instrument or machine which, in this instance, has a flat top panel 10. Much of the mechanism disposed beneath the top panel is omitted since it forms no part of the present invention. However, displayed on the top panel is a main switch 11, sockets 12, 13 and 14 into which may be plugged jacks extending to a microphone, loud speaker of a radio-phonograph, and an output. Also shown on the top panel is a volume controlling rheostat knob 15 and a switch knob 16 for switching the mechanism selectively for a reproducer or recorder. All of this will be readily understood by those skilled in the art and further description thereof is not deemed necessary for an understanding of the present invention.

Also appearing on top of the panel 10 is a drive capstan 17 which may be rubber covered to afford the desired frictional driving contact. The capstan 17 is driven from an electric motor 18 (FIGURE 13) which is connected to the capstan by speed reducing devices generally indicated at 19. This structure will be described in detail hereinafter. Alongside of the capstan drive wheel 17 is a transducer head 20 and adjacent the transducer and in line therewith is an erasure head 21. As will hereinafter appear, the magnetic tape extends along these heads and the capstan and is pressed against the heads by spring arms **20*a***.

Figures 2, 3, 4:
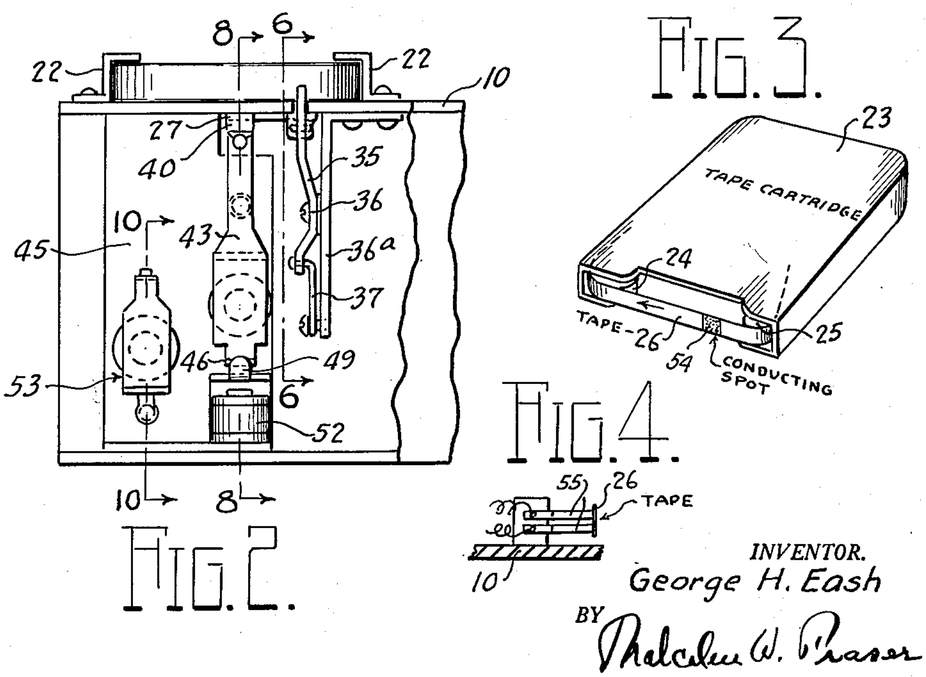
FIGURE 2 is a fragmentary side elevation of the instrument or machine shown in FIGURE 1, a portion of the side wall being broken away to show the tape cartridge retracting mechanism.
FIGURE 3 is a front end perspective view of the tape magazine or cartridge.
FIGURE 4 is a fragmentary sectional view on the line 4—4 of FIGURE 1.

Also mounted on the top panel 10 is a pair of laterally spaced parallel channel guides 22 which are secured to the panel and provide a way for an endless magnetic tape cartridge 23 which, as shown in FIGURE 3, is relatively thin and is closed on its several sides except for the front from which projects a portion of a guide roller 24 disposed at one side and a stationary cylinder 25 at the other side, the magnetic tape 26 passing from the guide 25 over the roller 24. The roller 24 is pressed against the capstan 17, clamping the magnetic tape therebetween, with sufficient pressure so that the rotation of the capstan imparts translatory movement to the tape. Although the same is not illustrated, it will be understood that a single reel is disposed within the magazine or cartridge 23 containing a coil of the magnetic tape which is withdrawn from the innermost convolution and wound upon the outer periphery of the coil. However, it will be understood that the specific structure of the magnetic tape cartridge 23 forms no part of the present invention except that an endless length of tape disposed within the magazine is of importance in this connection.

Electromechanical mechanism is provided for automatically retracting the cartridge 23 away from its drive capstan and the heads 20 and 21 in response to an electrical conducting spot 54 on the tape. As shown, a slide plate 27 is mounted on the under side of the panel 10 and has an elongated slot 28 through which guide pins 29 extend for restricting and guiding the to and fro movement thereof. On an extension at the front end of the slide plate 27 is an upturned flange 30 which projects through a slot 31 (FIGURE 6) of the panel 10. The arrangement is such that the flange 30 is engaged by the front end of the tape cartridge 23 when the latter is slid forwardly in the guide channels 22 into its operative or playing position. At the rear end and at one side of the slide plate 27 is a downturned flange 32 which is apertured to receive a horizontal link 33 which has a stop or head 34 at the inner end, the outer end being hooked into a hole in a vertically disposed lever 35. The lever 35 is pivoted adjacent its lower end on a pivot 36 connected to a bracket **36*a* which depends from the under side of the panel 10. An off-center leaf spring 37 has one end hooked into the lower end of the arm 35 and the other end anchored at 38 to the bracket 36*a*. The upper end of the arm 35 extends through a slot 39 in an edge of the top panel 10** so that it may be manually manipulated, if desired.

Figure 8:
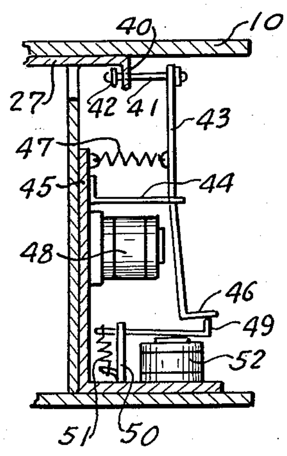
FIGURE 8 is a vertical sectional view substantially on the line 8—8 of FIGURE 2 showing the position occupied by the illustrated parts when the cartridge is advanced to its operative or playing position.
Figure 10:
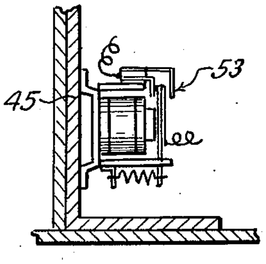
FIGURE 10 is a fragmentary sectional view substantially on the line 10—10 of FIGURE 2, showing the relay switch.

Spaced laterally of the downturned flange 32 is a similar flange 40 integral with the slide plate 27, and this flange also is apertured to receive a link 41 which is slidable through the aperture in the flange. Stops or heads 42 are provided at opposite ends of the link 41. The link 41 extends through an aperture in a vertical arm 43 which is pivoted intermediate its ends on a fulcrum bracket 44 which is suitably secured to an upright L-shaped supporting bracket 45. At the lower end of the vertical arm 43 is a bent end portion 46 which is engaged by the hook end of a catch arm 49. Mounted on the bracket support 45 is a solenoid 48 for attracting the lower portion of the arm 43, thereby to rock same in a clockwise direction for retracting the cartridge 23 away from the drive capstan 17 and the heads 20 and 21. The upper end portion of the arm 43 is under the influence of a coil spring 47 which connects that portion of the arm with the bracket 45 so that when the solenoid 48 is deenergized, the spring 47 urges the arm 43 in a counterclockwise direction. However, such movement is restrained by the hooked end of the catch arm 49. As shown, the arm 49 is fulcrumed on a vertical bracket 40 and a coil spring 51 engaging the outer end of the arm urges the hooked end upwardly toward the bent end 46 of the arm 43. Mounted on the base of the bracket 45 is a solenoid 52 which when energized, rocks the catch arm 49 downwardly to release the bent end 46, allowing the arm 43 to rock in a counterclockwise direction (FIGURE 8) to enable the slide to move forwardly when the tape cartridge 23 is pushed forwardly into operative playing position.

It will be understood that when the tape magazine 23 is advanced toward the drive capstan 17 and the heads 20 and 21, the front end of the cartridge engages the lug or flange 30 on the slide 27 but the slide cannot move forwardly because the vertical arm or armature 43 is restrained by the catch arm 49. Therefore, it is necessary first to energize the solenoid 52. This is accomplished by depressing the starter button 56 on the top panel 10 and when this takes place, the catch arm 49 is rocked downwardly to release the arm 43 and allow the slide 27 to move forwardly with the tape cartridge 23.

Figures 5, 6, 7:
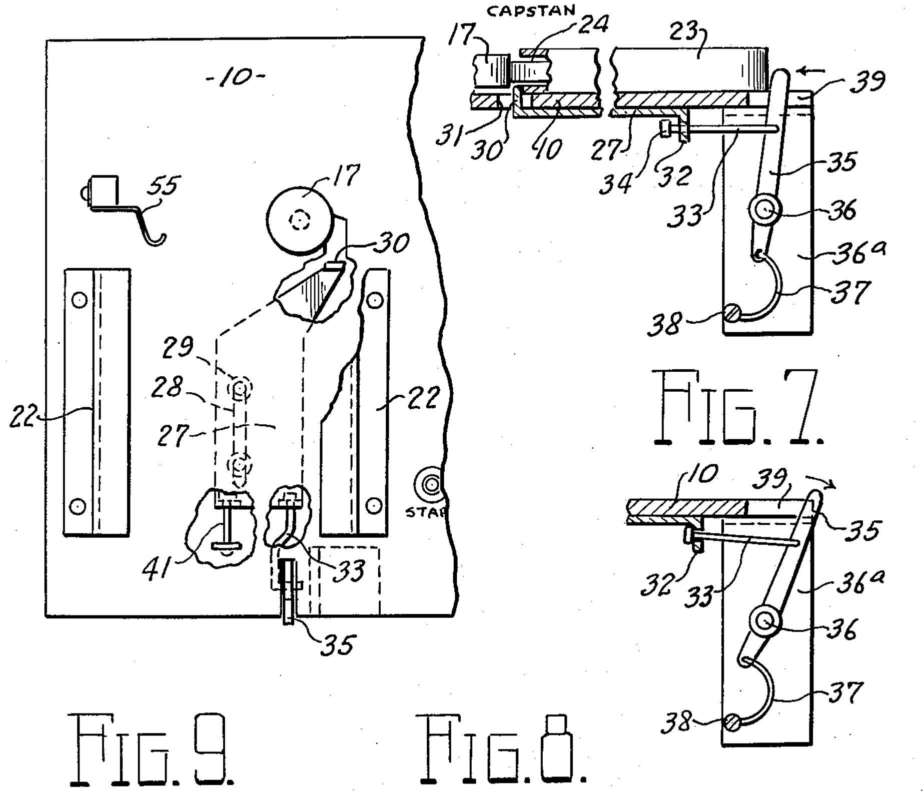
FIGURE 5 is a fragmentary top plan view similar to FIGURE 1 with the tape cartridge removed and showing the retracting mechanism in the non-playing or inoperative position.
FIGURE 6 is a vertical sectional view substantially on the line 6—6 of FIGURE 2, showing the tape cartridge in its advanced or playing position.
FIGURE 7 is a fragmentary sectional detail showing the spring-tensioned arm which engages the rear end of the cartridge in its retracted position, or the position occupied when the tape cartridge is in its retracted position.
Figure 9:
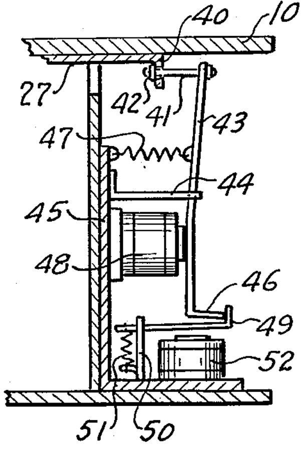
FIGURE 9 is a sectional view similar to FIGURE 8, but showing the position occupied by the illustrated parts when the cartridge is retracted or in non-playing position.

Provided on the tape within the cartridge 23 is an electrically conducting spot 54 which may be of conducting paint. When this spot is engaged by the spring arms 55 which are carried by the top panel 10, a circuit is established, it being noted on FIGURE 4 that the spring arm 55 is in two parts to make the circuit. A light current can then pass to a relay 53 which is also carried by the bracket 45 and upon energizing the relay 53, the heavier current can thence pass to the solenoid 48, causing the armature arm 43 to rock and abruptly retract the tape cartridge 23 away from the drive capstan and associated heads. This retracting movement causes the arm 35 to rock, as indicated in FIGURE 7, to its right-hand position which nevertheless is still in engagement with the rear end of the cartridge so that the cartridge is yieldably held between the lug or flange 30 and the upper end of the arm 35. Manifestly, when the tape cartridge 23 moves forwardly to operative playing position, the spring arm 35 rocks to the left as indicated in FIGURE 6, and imposes spring pressure against the rear end of the cartridge, urging it into the desired operative position. As above indicated, when the vertical arm 43 is actuated to the position shown in FIGURE 9 to retract the cartridge, then automatically the catch arm 49 engages the lower bent end 46 and holds the arm in this position even when the solenoid 48 is deenergized.

Figure 11:
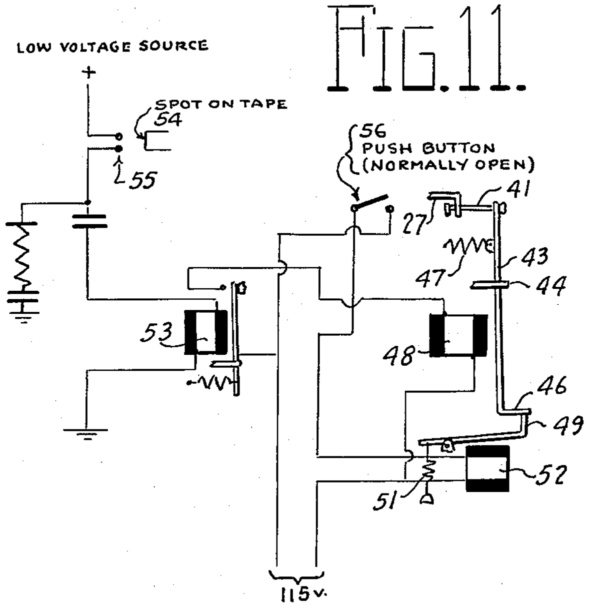
FIGURE 11 is a wiring diagram showing the electrical apparatus employed automatically to retract the tape cartridge in response to a conductive spot on the tape.

FIGURE 11 shows the electrical diagram by which the cartridge is automatically retracted in response to the engagement of the conducting spot 54 on the tape with the spring arm device 55, it being observed that the light current first passes to the relay 53 which then enables the heavier current to energize the solenoid 48. It will also be observed that the push button switch 56, upon being depressed, creates a circuit by which the solenoid 52 is energized to release the vertical arm 43, this being the first operation necessary in the application of the tape cartridge to the machine. In fact, the tape cartridge can not be advanced to its playing position until the starter button 56 is first depressed. After that has taken place, and the cartridge pressed into its playing position, the remaining operation is entirely automatic. It will be understood that when the tape cartridge is retracted away from the drive capstan 17 and the associated heads, the capstan continues to rotate in the normal manner so that when another cartridge is moved into playing position, it is not necessary for the capstan to regain its proper speed because its normal speed has not been interrupted by the retraction on the cartridge.

Figure 13:
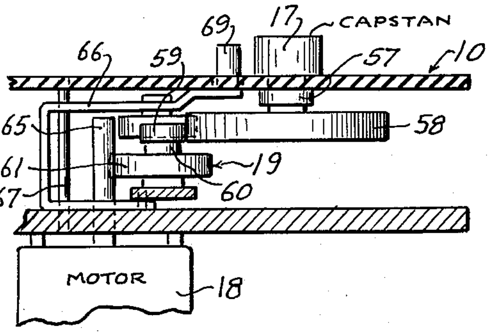
FIGURE 13 is a sectional view substantially on the line 13—13 of FIGURE 12.

Mechanism is provided for speeding up the drive capstan 17 to move the tape at a higher speed to enable advancing of the endless tape, in case the instrument is used for reproducing sound, to a point where a certain portion of the message or sound may be played back. This movement can be of such rapidity that the reproduced sound is unintelligible so that the frequencies generated by the signal waves on the tape are thrown into a higher audio range. Thus the increased driving speed may be thirty to forty times that of the normal playing speed. This obviates the necessity of playing the tape until the desired point on it is reached at the lower speed. As shown in FIGURE 13, the capstan 17 which is on the upper side of the panel 10 has a vertical shaft 57 extending through the panel and on the under side thereof is a relatively large metallic rimmed wheel 58 which frictionally engages a relatively small wheel 59 on a vertical stub shaft 60. Also on the stub shaft 60 is a somewhat larger wheel 61 which engages an extension 65 of the armature shaft of the electric motor 18. The stub shaft 60 is carried by a slide plate 62 which is mounted for sliding movements in guides 63. The mounting plate 62 is urged by a spring 64 to cause the wheels 61 and 59 to engage the armature extension 65 and capstan wheel 58 respectively. It will be understood that the wheels 59 and 61 are rubber covered or rubber tired in order to provide a friction drive.

A U-shaped bracket arm 66 is pivotally mounted at one end on an upright pin 67 and carries a high speed rubber covered wheel 68 which may be moved into position to engage the shaft extension 65 and capstan wheel 58 respectively, thereby to drive the capstan at a higher speed. A suitable connection 66a is provided by the bracket arm 66 and the slide mounting 62 so that rocking of the arm 66 imparts movement to the mounting 62. The bracket arm 66 has an extension provided with a knob 69 extending upwardly through a slot 70 in the panel 10.

Figure 12:
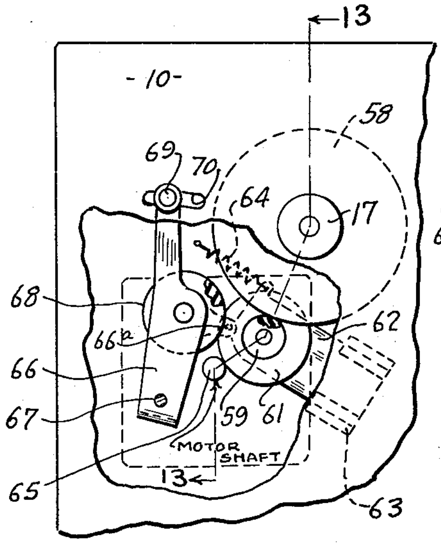
FIGURE 12 is an enlarged top plan fragmentary view with parts broken away, showing the normal or playing drive for the tape operating capstan and the associated high speed drive for the capstan.

In operation, when it is desired to speed up the capstan 17 for moving the tape at a much higher speed, the knob 69 is rocked in a clockwise direction (FIGURE 12) successively to push the slide mounting 62 away from the shaft 65 and capstan wheel 58 and successively move the higher speed wheel 68 into operative engagement. The operator must, therefore, hold the knob 69 until the desired place on the tape has been reached and then, by releasing the knob, the spring 64 will automatically reestablish the normal drive.

It is to be understood that numerous changes in details of construction, arrangement, operation and choice of materials may be effected without departing from the spirit of the invention especially as defined in the appended claims.

What I claim is:

1. In a magnetic tape recording instrument, an endless tape cartridge, a length of magnetic tape in said cartridge, a rotary drive capstan for driving the tape, a transducer head, a pressure roller in siad cartridge for pinching the tape against the capstan whereby said tape is driven past the transducer head, a signal spot on the tape, and sensing means for producing a signal in response to movement of said spot therepast, the improvement which comprises; a guideway supporting said cartridge for relative movement with respect to said capstan between a first position in which said pressure roller is in tape-pinching relationship with said capstan whereby said tape is driven and a second position in which said pressure roller is removed from tape-pinching relationship with said capstan, control circuit means operating in response to said signal, and means operated by said control circuit means for moving said cartridge from siad first position to the second, whereby the drive of said tape past the transducer ceases when said sensing means detects said spot.

2. In a magnetic tape recording instrument, an endless tape cartridge, a length of magnetic tape in said cartridge, a rotary driving capstan for frictionally engaging the tape for imparting translatory movement thereto, a transducer head adjacent the capstan, a signal spot on the tape, and means for producing a signal in response to movement of the spot therepast, the improvement which comprises, means mounting said cartridge for movement between an extended position in which the tape is drivingly engaged against the capstan and a retracted position in which the tape is removed from driving engagement against the capstan, actauting means operable for moving said cartridge from its extended position to its retracted position, and means including an electric circuit responsive to said signal for operating said actuating means.

3. In a magnetic tape recording instrument, an endless tape cartridge, a length of magnetic tape in said cartridge, a rotary driving capstan for frictionally engaging the tape for imparting translatory movement thereto, a transducer head adjacent the capstan, a signal spot on the tape, and means for producing a signal in response to movement of the spot therepast, the improvement which comprises, means mounting said cartridge for movement between an extended position in which the tape is drivingly engaged against the capstan and a retracted position in which the tape is removed from driving engagement against the capstan, over-center spring means alternatively biasing said cartridge towarsd said positions, electromagnetic actuating means operable for moving said cartridge from its extended position to its retracted position, and means including an electric circuit responsive to said signal for energizing said electromagnetic actuating means.

4. In a magnetic tape recording instrument, a support, an endless tape cartridge, a length of magnetic tape in said cartridge, a rotary driving capstan on said support for frictionally engaging the tape for imparting translatory movement thereto, a transducer head on said support adjacent the capstan, a signal spot on the tape, and means for producing a signal in response to movement of the spot therepast, the improvement which comprises, means mounting said cartridge member on said support for movement between an extended position in which the tape is drivingly engaged against the capstan and a retracted position in which the tape is removed from driving engagement against the capstan, a solenoid, on said support, actuating means including a solenoid armature and a cartridge engaging member on said armature operable upon energization of said solenoid for moving said cartridge from its extended position to its retracted position, and means including an electric circuit responsive to said signal for energizing said solenoid.

5. In a magnetic tape recording instrument, a support, an endless tape cartridge, a length of magnetic tape in said cartridge, a rotary driving capstan on said support for frictionally engaging the tape for imparting translatory movement thereto, a transducer head on said support adjacent the capstan, a signal spot on the tape, and sensing means for producing a signal in response to movement of the spot therepast, the improvement which comprises, means mounting said cartridge member on said support for movement between an extended position in which the tape is drivingly engaged against the capstan and a retracted position in which the tape is removed from driving engagement against the capstan, cartridge retracting means including a lever pivoted on said support, a member on said lever engageable with said cartridge for moving the cartridge from its extended position to its retracted position upon movement of said lever respectively from a first position to a second position, a solenoid for moving said lever from its first to its second position upon energization of the solenoid, and electric circuit means responsive to said signal for energizing said solenoid.

6. The combination claimed in claim 5, and latch means for releasably holding said lever in said second position.

7. The combination claimed in claim 6, a second solenoid energizable for releasing said latch, a normally open electric circuit means for energizing said second solenoid, and a manually operable switch for closing said electric circuit means.

8. In a magnetic tape recording instrument, an endless tape cartridge, a length of magnetic tape in said cartridge, a rotary drive capstan for driving the tape, a transducer head, a pressure roller in said cartridge for pinching the tape against the capstan whereby said tape is driven past the transducer head, a signal spot on the tape, and sensing means for producing a signal in response to movement of said spot therepast, the improvement which comprises; a guideway supporting said cartridge for relative movement with respect to said capstan between a first position in which said pressure roller is in tape-pinching relationship with said capstan whereby said tape is driven and a second position in which said pressure roller is removed from tape-pinching relationship with said capstan, control circuit means operating in response to said signal, and means operated by said control circuit means for effecting relative movement between said capstan and said pressure roller, whereby the drive of said tape past the transducer ceases when said sensing means detects said spot.

References Cited in the file of this patent

UNITED STATES PATENTS

| | | |
|---|---|---|
| 2,227,259 | Hokanson | Dec. 31, 1940 |
| 2,560,234 | Masterson | July 10, 1951 |
| 2,572,596 | Camras | Oct. 23, 1951 |
| 2,668,059 | Roberts | Feb. 2, 1954 |
| 2,706,638 | Bruderlin et al. | Apr. 19, 1955 |
| 2,732,144 | Jones | Jan. 24, 1956 |
| 2,778,636 | Eash | Jan. 22, 1957 |
| 2,778,637 | Eash | Jan. 22, 1957 |
| 2,785,892 | Pastor | Mar. 19, 1957 |
| 2,867,389 | Viets | Jan. 6, 1959 |
| 2,879,341 | Kucher | Mar. 24, 1959 |